United States Patent [19]

Li

[11] Patent Number: 5,392,669
[45] Date of Patent: Feb. 28, 1995

[54] BRAKE LEVER FOR A HANDLEBAR OF A BICYCLE

[76] Inventor: Jung-Hua Li, No. 9, Lane 300, Hsiao-Yang Rd., Changhua City, Taiwan, Prov. of China

[21] Appl. No.: 109,774

[22] Filed: Aug. 20, 1993

[51] Int. Cl.6 .................. F16C 1/10; G05G 11/00
[52] U.S. Cl. ..................... 74/502.2; 74/489; 74/551.1; 74/551.8; 403/90
[58] Field of Search ............ 74/551.1–551.8, 74/502.2, 489; 403/90, 88; 280/279

[56] References Cited

U.S. PATENT DOCUMENTS

| 4,974,469 | 12/1990 | Romano | 74/502.2 |
| 5,176,042 | 1/1993 | Bean et al. | 74/502.2 |
| 5,247,852 | 9/1993 | Guerr | 403/90 |

FOREIGN PATENT DOCUMENTS

| 0035359 | 9/1981 | European Pat. Off. | 74/551.1 |
| 902333 | 8/1945 | France | 74/489 |
| 1210326 | 3/1960 | France | 74/489 |
| 2535669 | 5/1984 | France | 74/551.1 |
| 3908159 | 9/1989 | Germany | 74/502.2 |
| 2167839 | 6/1986 | United Kingdom | 74/502.2 |

*Primary Examiner*—Vinh T. Luong
*Attorney, Agent, or Firm*—Schwarze Jacobs & Nadel Panitch

[57] ABSTRACT

A brake lever includes two separate sections which are connected to one another by an engaging screw to form an angle between two connected ends of the two sections.

1 Claim, 4 Drawing Sheets

BRAKE LEVER FOR A HANDLEBAR OF A BICYCLE

BACKGROUND OF THE INVENTION

1. Field of the Invention

The invention relates to a brake lever, more particularly to a brake lever for a handle bar of a bicycle.

2. Description of the Related Art

FIG. 1 shows a conventional brake lever 2 which is installed on a handlebar 1 of a bicycle. As illustrated, the brake lever 2 has a first end pivoted to a positioning seat 111 which is fixed detachably on the handlebar 1. When the bicycle is in use, the user must grasp two hand grip portions 112 of the handlebar 1 to balance the bicycle. In order to stop the bicycle, the user has to move his hands from the hand grip portions 112 to the handlebar 1 in order to operate the brake lever 2. Because the user has to free his hands from the hand grip portions 112 before he can operate the brake lever 2, the user loses control of the bicycle, thus resulting in collision or toppling of the bicycle.

FIG. 2 illustrates another conventional brake lever 3. The brake lever 3 has a first section 3a with a first end connected pivotally to a positioning seat 6 of a handlebar 5 of a bicycle, and a second section 3b which is formed integrally with the first section 3a and forms an angle with the latter. After the brake lever 3 is fixed to the handlebar 5, the second section 3b is spaced relative to the hand grip portion 4 at a fixed distance.

Note that the second section 3b of the brake lever 3 is not always at a desired position relative to the hand grip portion 4 of the handlebar 5 to suit the user. The position of the second section 3b of the brake lever 3 with respect to the hand grip portion 4 needs to be adjusted in order to suit the user and in order to complement with the configuration of the hang grip portions of the handlebar of a bicycle.

SUMMARY OF THE INVENTION

Therefore, the main objective of the present invention is to provide a brake lever which includes two sections, one of which can be adjusted relative to the other so that when the brake lever is installed on a handlebar of a bicycle, the brake lever can be operated by any individual and can complement with the configuration of the hand grip portion of the handlebar of a bicycle.

According to the present invention, the brake lever includes a first section that has a first end connected pivotally to a positioning seat of a handlebar of a bicycle and a second section which is formed separately from the first section. The second section has a front end connected detachably to a second end of the first section by means of screw and thus forms an angle in cooperation with the same at the connected ends. The relative position of the second section with respect to hand grip portion of the handlebar can be adjusted to permit any individual to operate the brake lever of the present invention. Furthermore, since the second section can be adjusted relative to the first section, the brake lever of the present invention can suit handlebars of different designs and configurations.

BRIEF DESCRIPTION OF THE DRAWINGS

Other features and advantages of the present invention will become apparent in the following detailed description of the preferred embodiments with reference to the accompanying drawings, in which.

DETAILED DESCRIPTION OF THE PREFERRED EMBODIMENTS

Figure 1:
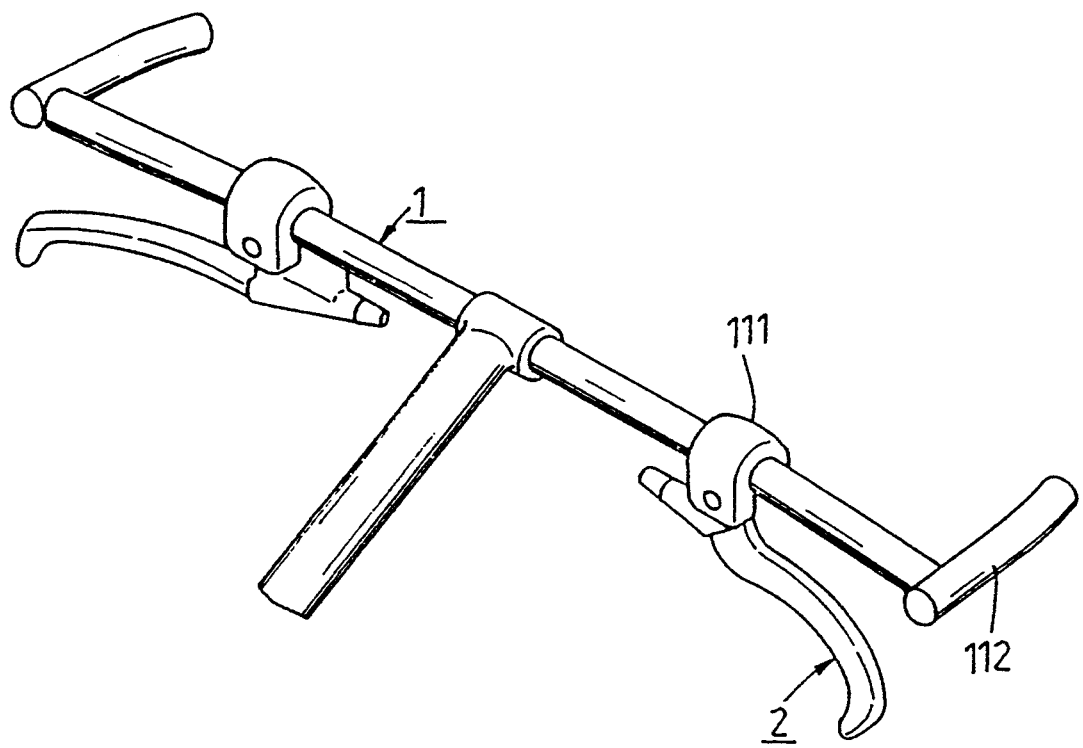
FIG. 1 shows a conventional brake lever.
Figure 2:
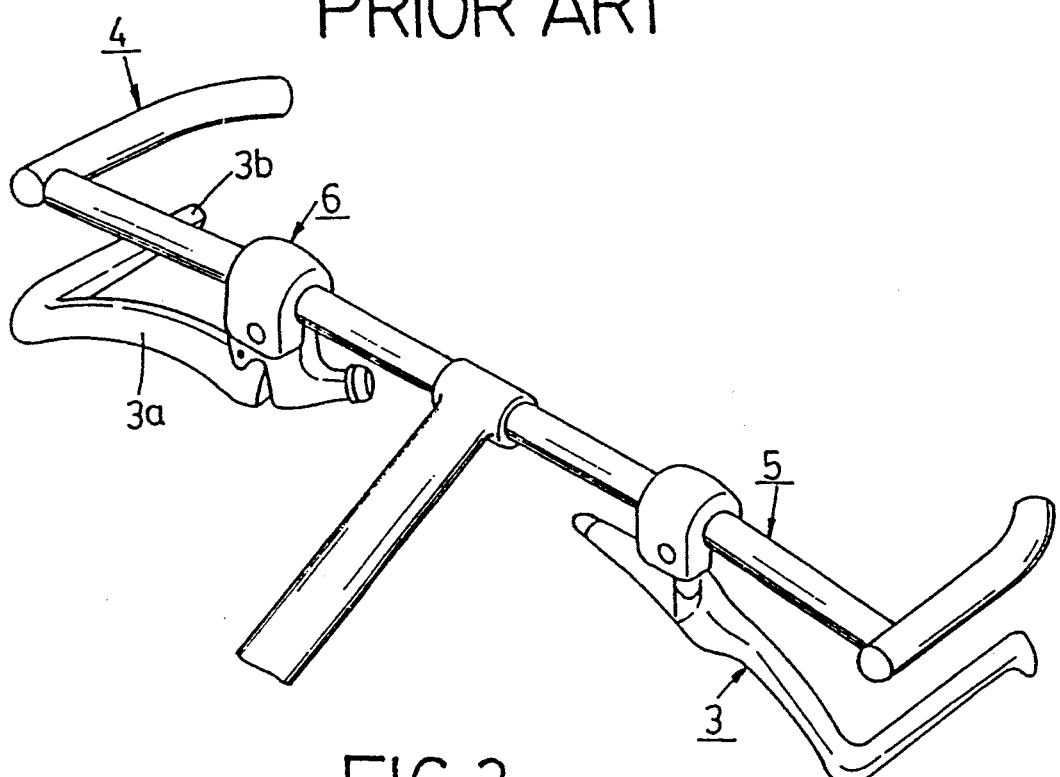
FIG. 2 shows another conventional brake lever.
Figure 3:
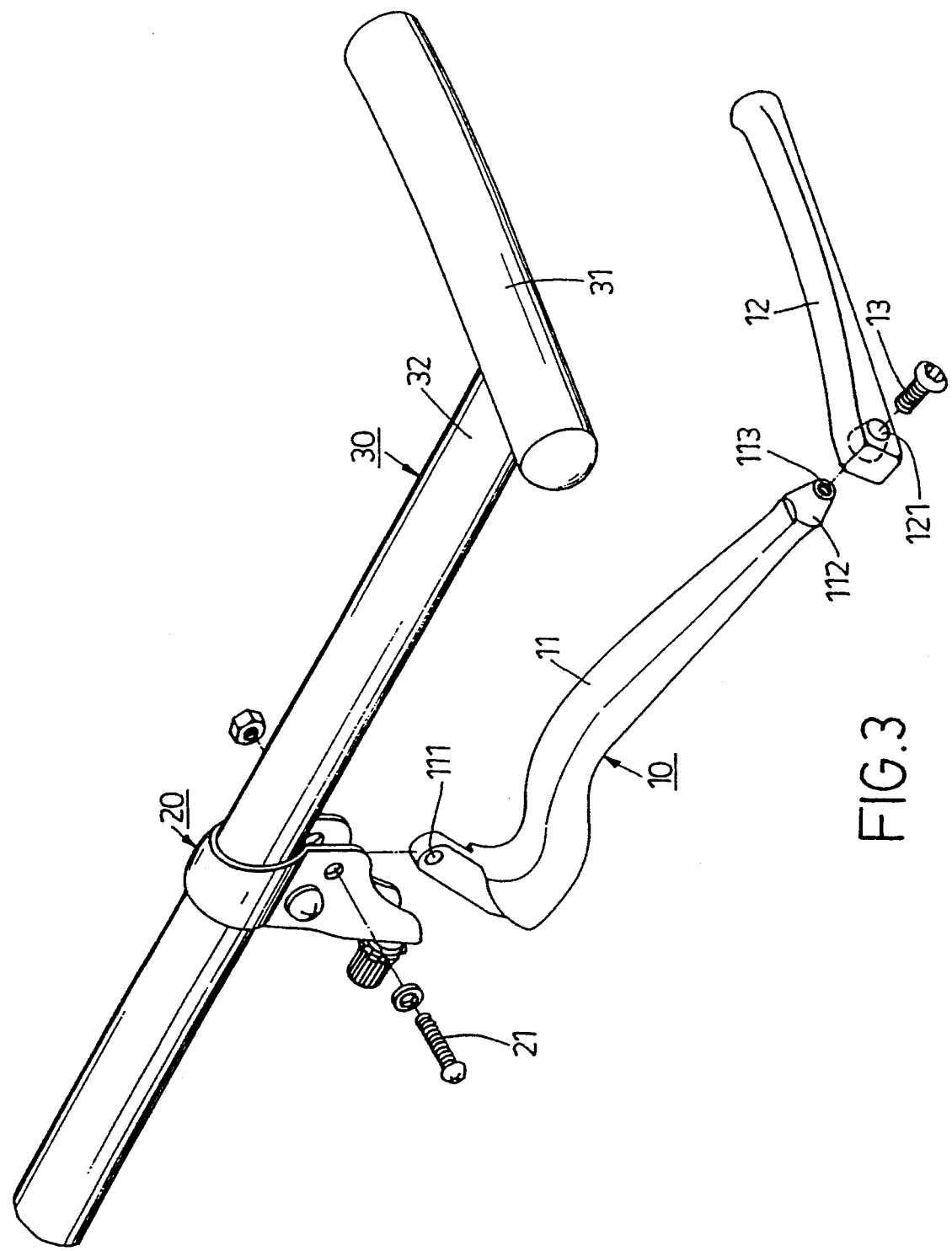
FIG. 3 shows an exploded view of a brake lever of the present invention.

Referring to FIG. 3, a brake lever 10 of the present invention has a first section 11 with a first end which is connected pivotally to a positioning seat 20 that is fixed detachably on a horizontal rod 32 of a handlebar 30 in a bicycle by means of a locking screw 21, and a second section 12 formed separately from the first section 11. A second end of the first section 11 has a tapered portion 112 and a threaded hole 113 which is formed through the tapered portion 112 and which is disposed along a longitudinal length of the first section 11. A front end of the second section 12 is formed with a tapered hole 121 which is transverse to a longitudinal length of the second section 12. The tapered hole 121 of the second section 12 receives the tapered portion 112 of the second end of the first section 11 so that an angle is formed between the two connected ends of the first and second sections 11, 12. An engaging screw 13 is threaded into the threaded hole 113 of the first section 11 via the tapered hole 121 in the front end of the second section 12, thereby connecting the first and second sections 11, 12.

Figure 4:
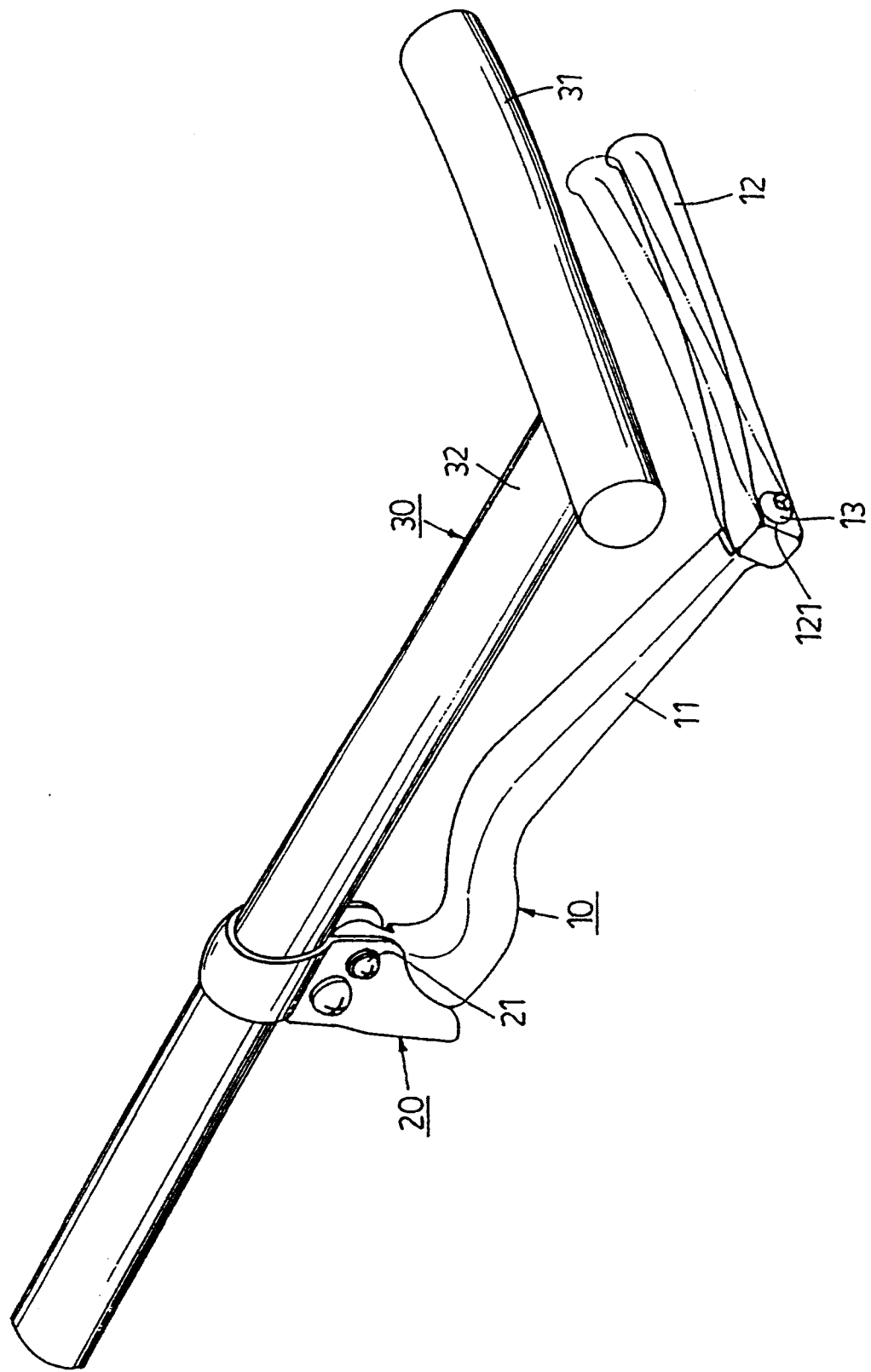
FIG. 4 shows how the brake lever of the present invention is adjusted relative to a handlebar of a bicycle.

Note that the handlebar 30 has two hand grip portions 31 which are integrally formed therewith, thereby preventing adjustments in the positions of the hand grip portions 31. After the brake lever 10 of the present invention is attached to the handlebar 30, the hand grip portion 31 of the handlebar 30 is spaced from the second section 12 of the brake lever 10 at a certain distance. Since the size of the hands of every individual differs, the certain distance cannot suit each individual and should be adjusted in accordance with the individual hand and in order to complement with the configuration of the hand grip portions 31 of the handlebar 30. Since the first and second sections 11, 12 of the brake lever 10 are detachably screwed together, the second section 12 can be adjusted with respect to the hand grip portion 31 of the handlebar 30 by retaining the same at a different distance relative to the hand grip portion 31. Referring to FIG. 4, the phantom lines represent the second section 12 of the brake lever 10 when in an adjusted position.

The tapered portion 112 at the first section 11 of the brake lever 10 can be constructed to have polygonal faces, while the configuration of the tapered hole 121 in the second section 12 can be consequently modified to correspond with the shape of the tapered portion 112. This permits firm engagement between the first and second sections 11, 12 and facilitates adjustment of the second section 12 relative to the hand grip portion 31.

Figure 5:
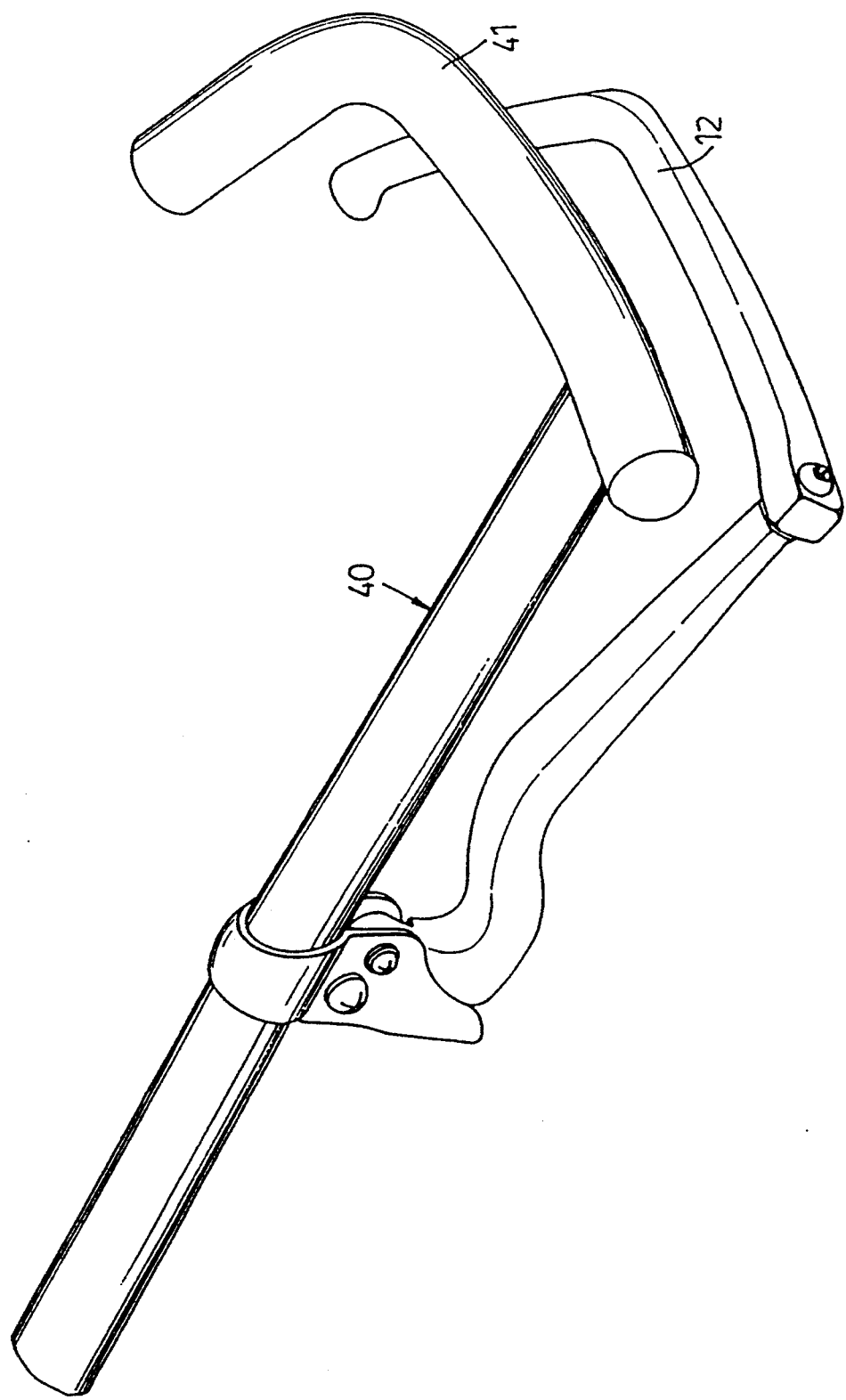
FIG. 5 shows another preferred embodiment of a brake lever of the present invention when installed on a handlebar of a bicycle.

Another preferred embodiment of the brake lever of the present invention is shown in FIG. 5. The hand grip portion 41 of the handlebar 40 is substantially curved, the second section 12 of the brake lever of the present invention is correspondingly curved to complement with the former.

While preferred embodiments have been explained and described, it will be apparent that many changes and modifications can be made in the general construction and arrangement of the present invention without departing from the scope and spirit thereof. Therefore, it is desired that the present invention be not limited to the exact disclosure but only to the extent of the appended claims.

I claim:

1. A brake lever for a handlebar of a bicycle, said handlebar including a positioning seat fixed detachably thereon, said brake lever comprising:

a first section having a first end and a second end, said first end for being connected pivotally to said positioning seat and a second section which is separately formed from said first section, said Second section having a front end connected detachably to said second end of said first section by means of a screw, said second section extending from said second end of said first section and forming an angle in cooperation with said first section at said two connected ends of said first and second sections, a relative position of said second section with respect to said handlebar being adjustable, wherein said second end of said first section is tapered and has a threaded hole formed along a longitudinal length of said first section, and said front end of said second section has a tapered through hole which is formed transverse to a longitudinal length of said second section and which receives said second end of said first section therein.

* * * * *